Feb. 12, 1929.

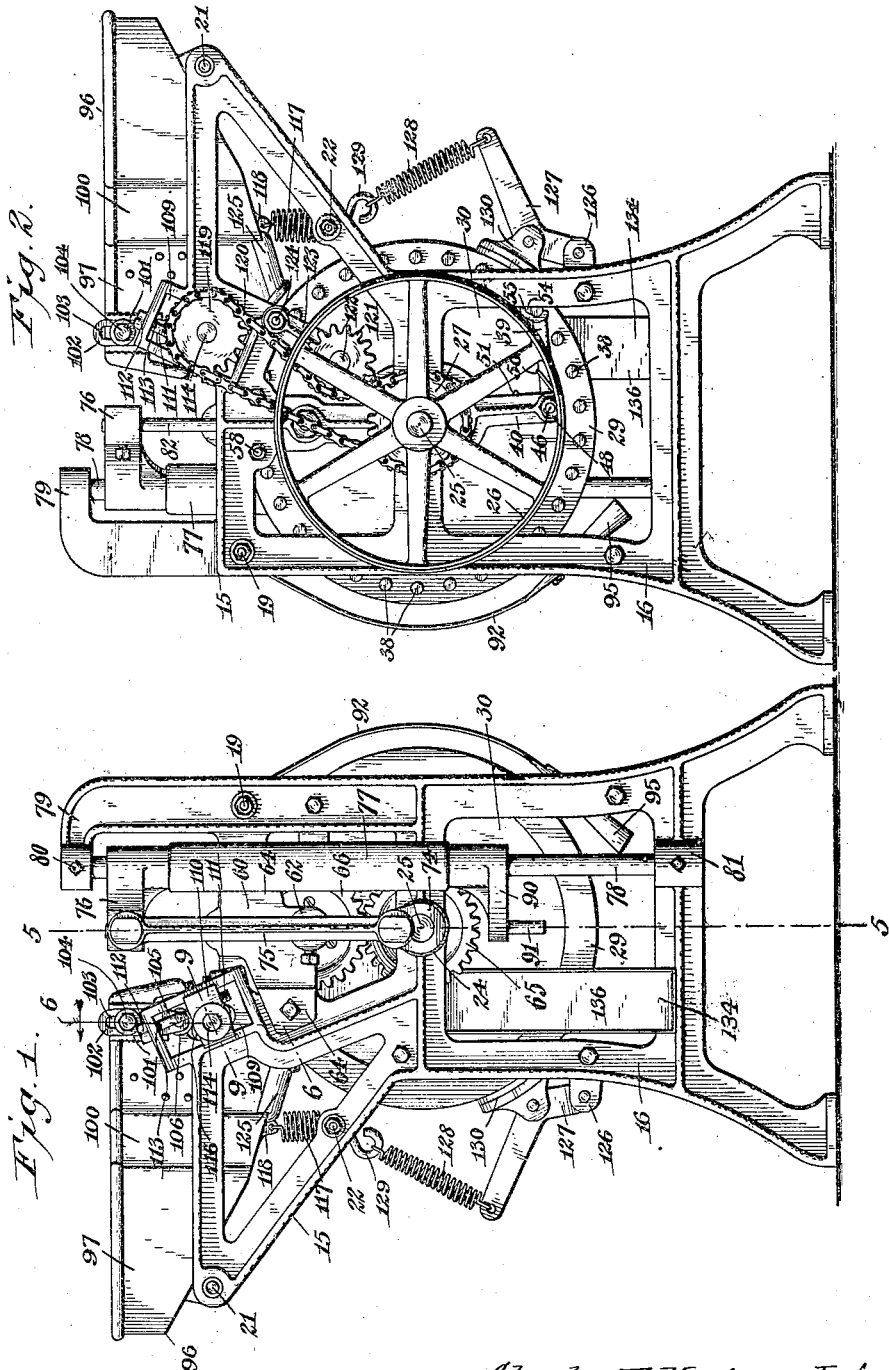

C. T. HOWSON 1,701,533

CHERRY PITTING MACHINE

Filed May 4, 1925

Charles T. Howson, Inventor.

By Emil Kenhart

Attorney.

Witness:
T. J. Oberst,

Feb. 12, 1929.

C. T. HOWSON

CHERRY PITTING MACHINE

Filed May 4, 1925

Charles T. Howson, Inventor.

By Emil Kuehach

Attorney.

Feb. 12, 1929.  
C. T. HOWSON  
CHERRY PITTING MACHINE  
Filed May 4, 1925
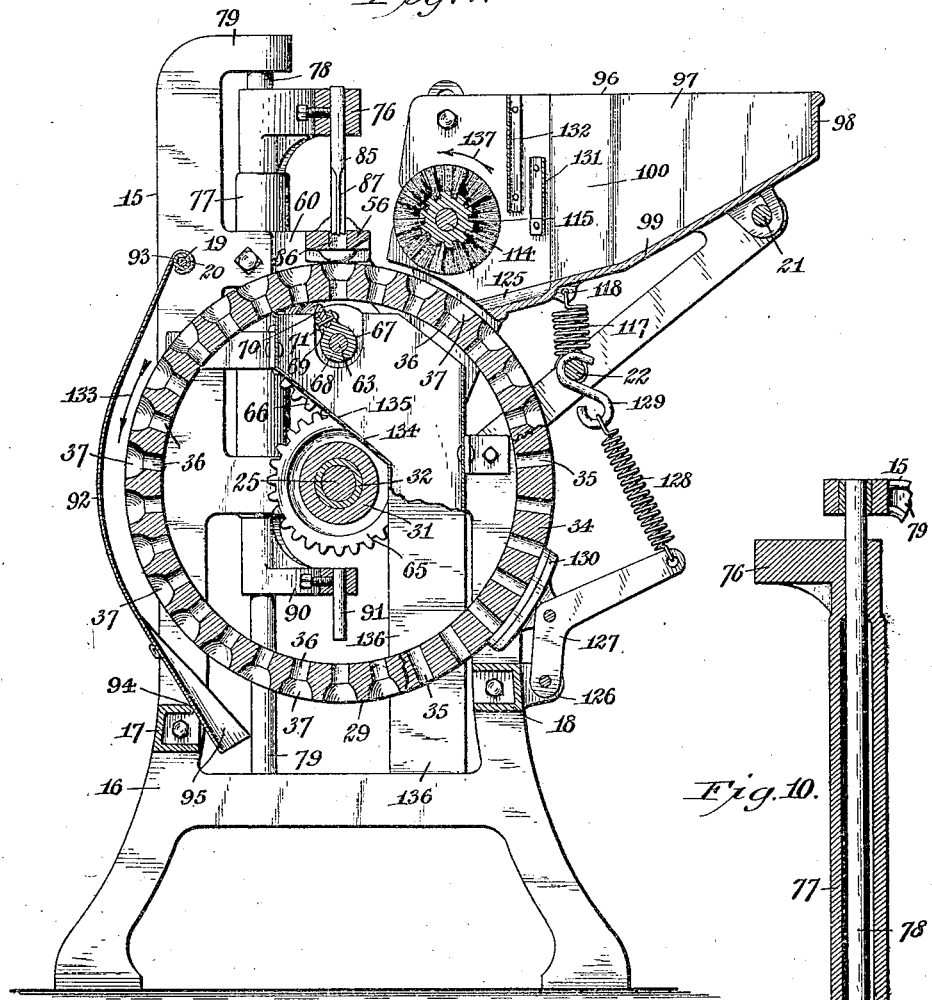
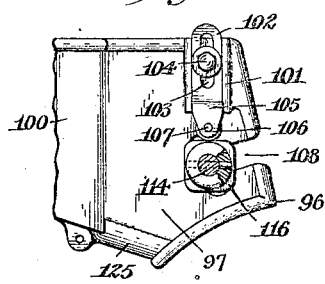
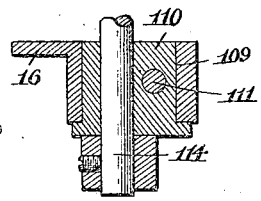

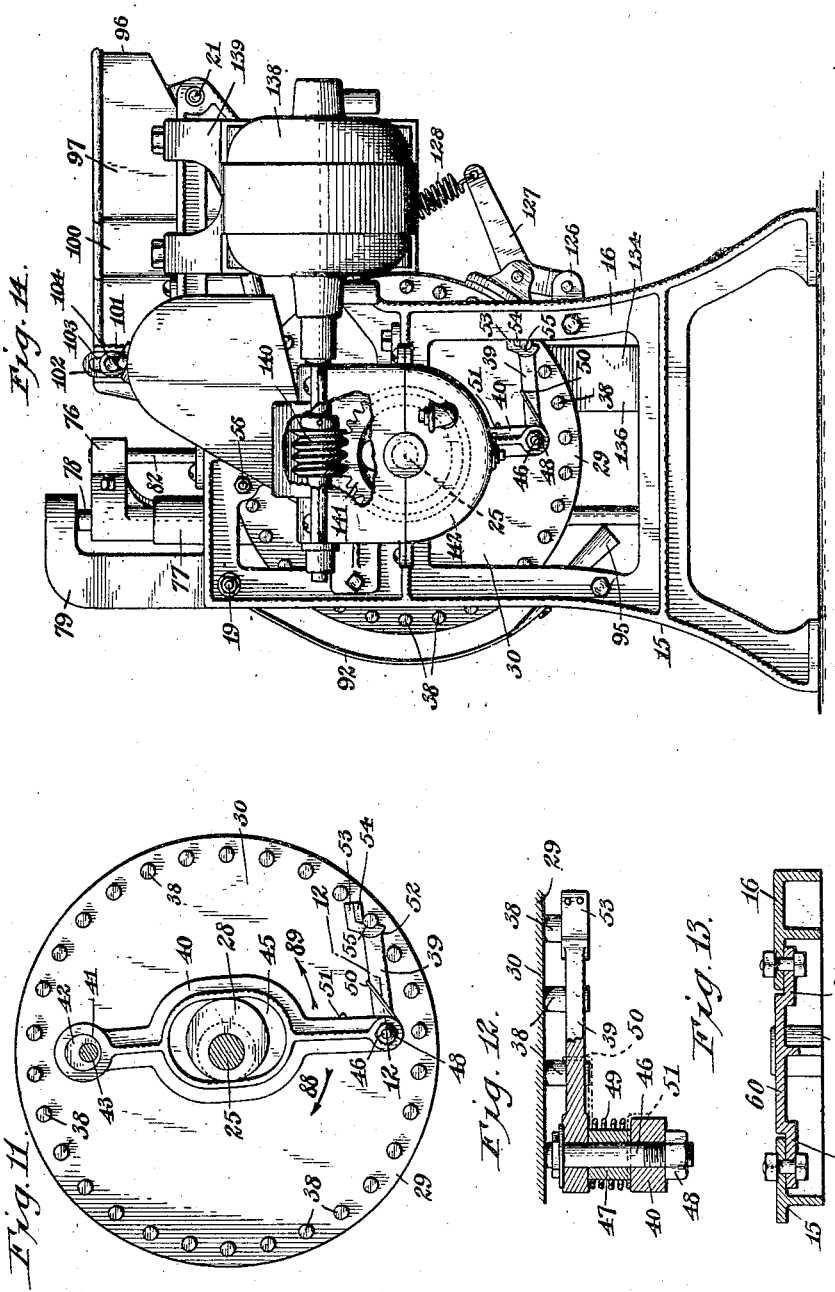

Patented Feb. 12, 1929.

1,701,533

UNITED STATES PATENT OFFICE.

CHARLES T. HOWSON, OF SILVER CREEK, NEW YORK, ASSIGNOR TO HUNTLEY MANUFACTURING CO., OF SILVER CREEK, NEW YORK, A CORPORATION OF NEW YORK.

CHERRY-PITTING MACHINE.

Application filed May 4, 1925. Serial No. 27,782.

My invention relates to improvements in cherry-pitting machines, and more particularly to a power-driven machine.

One of the objects of my invention is to provide a machine which will automatically feed cherries from a hopper or receptacle, deliver the same from said hopper or receptacle to pitting mechanism, and separate the pits, after being removed from the cherries, from the meat of the cherries and deliver the pits and meat through separate channels to receptacles arranged to receive the same.

Another object of my invention is to provide a machine of this type, which is comparatively simple in construction and in which the parts are so combined as to assure increased capacity and effective operation while reducing the attention required to the minimum.

A further object is to provide improved cherry feeding mechanism; to simplify the pitting mechanism; and to equip the machine with improved means for ejecting any pits or meaty portions of the cherries which may not be readily delivered from the machine.

Another object of my invention is to provide novel means for oscillating the feeding hopper; to provide improved mechanism for imparting rotary movement intermittently to the pitting cylinder or drum; and to provide improved means for limiting the rotary movement of said cylinder or drum when operated intermittently.

A still further object of my invention is to provide a machine having an assemblage of parts co-operating to assure free operation of such parts, and which may be either power-driven or manually-operated, as may be desired.

With the above and other objects in view to appear hereinafter, the invention consists in the novel features of construction, and in the arrangement and combination of parts to be hereinafter described and more particularly pointed out in the subjoined claims.

In the drawings:—

Figs. 1 and 2 are side elevations of the cherry pitting machine, viewed from opposite sides.

Fig. 7 is a transverse vertical section through the machine.

Fig. 8 is a vertical section through the upper portion of the machine, taken on line 8—8, Fig. 4, looking in the direction of the arrow crossing said line.

Fig. 9 is an enlarged section of the hopper-brush shaft bearing, taken on line 9—9, Fig. 1.

Fig. 10 is an enlarged vertical section through the guide for the combined pitting and ejector mechanism.

Fig. 11 is a vertical transverse section, taken on line 11—11, Fig. 5.

Fig. 12 is an enlarged section taken on line 12—12, Fig. 11.

Fig. 13 is a transverse section taken on line 13—13, Fig. 5.

Fig. 14 is a side elevation of a motor-driven cherry pitting machine embodying my invention, part of the casing enclosing the driving mechanism being broken away to better illustrate the means of operating the machine.

Figure 4:
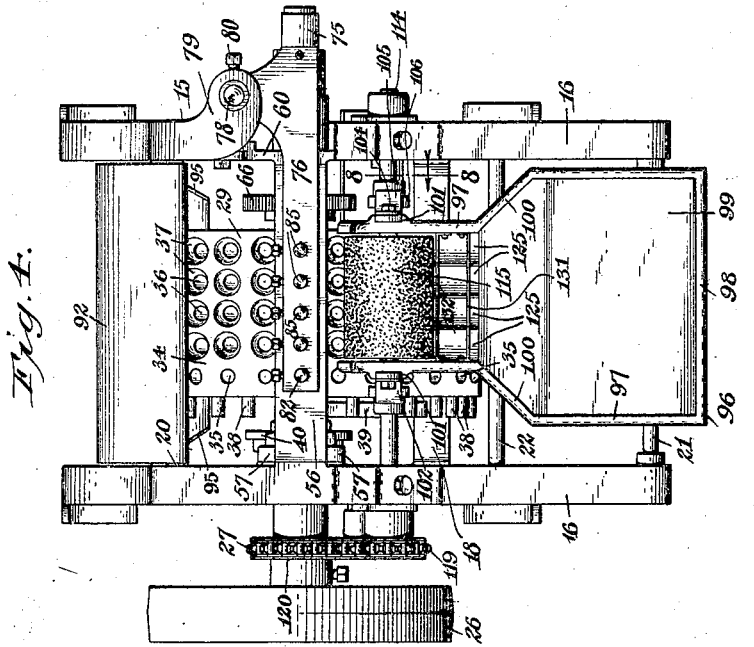
Fig. 4 is a plan view of the same.
Figure 3:
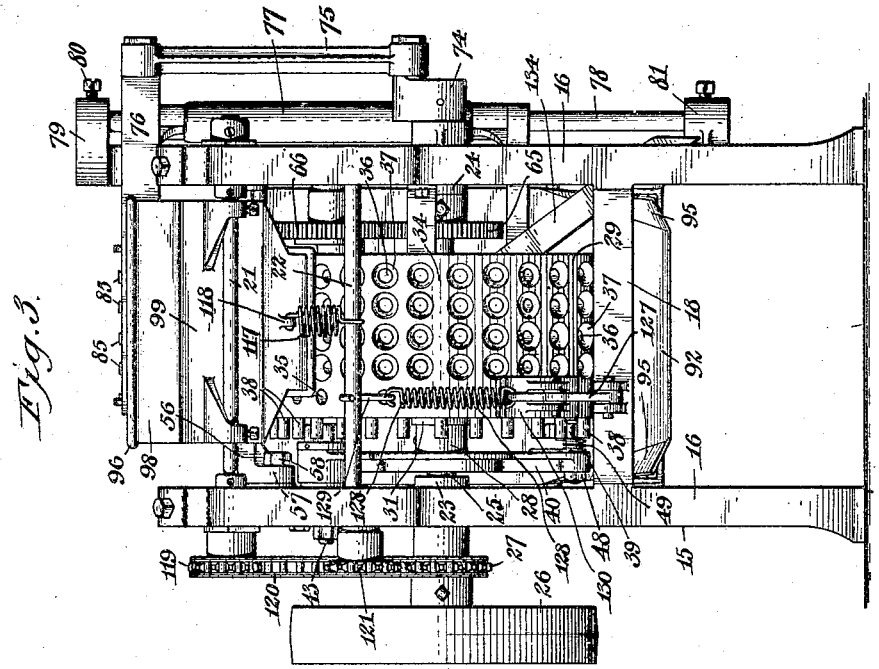
Fig. 3 is a front elevation of the machine.

The reference numeral 15 designates the frame of the machine, which comprises two side members 16, channeled connector members 17, 18 connecting said side members together a distance from their lower ends, a connector tie bolt 19 near the upper end of the frame, around which a spacing sleeve 20 is placed, and tie rods 21, 22 at the upper region of the machine; said connector member, tie bolt and tie rods serving to connect said side members 16 together in a rigid manner.

The side members 16 of the frame are preferably of skeleton formation so as to reduce the weight of the same and each comprises comparatively narrow webbed portions disposed vertically, longitudinally, and at an angle to another and preferably integral. These side members have alined bearings 23, 24 formed therein in which the main or drive shaft 25 of the machine is journaled, said shaft extending outwardly beyond both side members 16. In the preferred construction a drive pulley 26 is secured to one end of the main or drive shaft, said pulley being spaced from the bearing 23 in one of the side members 16.

Secure to said main or drive shaft between said bearing 23 and said pulley 26 is a sprocket wheel 27. Secured to said main or drive shaft near the inner end of the bearing 23 is a cam 28, and loosely mounted on said drive shaft is a pitting cylinder or drum 29 which is closed at one end by a wall 30 and has its other end open. This cylinder or drum is provided with a hub 31 extending a slight distance outwardly from said wall 30 and a considerable distance inwardly therefrom so as to provide an elongated bearing for said cylinder or drum. This hub is preferably provided with a brass or other suitable lining 32 so that the drum may rotate freely on the drive shaft without necessitating frequent re-boring.

The cylinder or drum is held against movement lengthwise on the shaft 25 in one direction by a collar 33 fastened to said shaft and having one end of the hub of said cylinder in moving contact therewith, while the other end of said hub is in moving contact with the hub of the cam 28. The circumferential wall 34 of said cylinder or drum is provided with a circular series of guide or pilot openings 35, which are arranged in close proximity to the end wall 30 of said cylinder or drum, and said circumferential wall is also provided with a plurality of circular series of pitting openings 36, which are in longitudinal alinement with the guide or pilot openings 35, and may, for convenience be said to be disposed in longitudinal rows. The pitting openings 36 are enlarged at their outer ends to form cavities or pockets 37 adapted to receive cherries to be pitted, the inner portions of the pitting openings being of a diameter somewhat smaller than the smallest cherry to be delivered into said cavities or pockets so that there is no possibility of the cherries passing or being forced through the inner portions of said pitting openings.

Projecting outwardly from the end wall 30 of the pitting cylinder or drum is a circular series of pins 38 which form part of what may be termed ratchet mechanism, utilized to give the cylinder or drum intermittent rotary movement. These pins, or ratchet pins as they may be termed, correspond in number to the longitudinal rows of pitting openings 36, so formed by reason of the plurality of circular series of pitting openings being disposed that corresponding openings are alined longitudinally.

Adapted for co-action with the ratchet pins 38 is a pawl 39 pivotally secured to the lower end of a ratchet lever 40, the upper end of which is provided with a circular opening 41 in which an eccentric bushing 42 is arranged, said bushing being rotatably adjusted on a bolt 43 passed therethrough and through one of the side members 16, as at 44. This ratchet lever is provided between its ends with an elongated opening 45 in which the cam 28 is arranged. The transverse dimension of said opening 45 corresponds with the diameter of said cam so that the cam is in contact with the wall of said opening at opposite points at all times, and by reason of the main or drive shaft passing eccentrically through said cam and said cam being rotated with said shaft, the ratchet lever is adapted to oscillate on the eccentric bushing 42. By adjusting the eccentric bushing 42, the movement of the ratchet lever 40 can be increased or diminished, and consequently the intermittent rotary movement of the pitting cylinder or drum governed to a nicety.

For the purpose of pivotally connecting the pawl 39 to the lower end of said ratchet lever, a screw bolt 46 is passed through said pawl, through the lower end of said lever, and through a spacing sleeve 47 between the two, a nut 48 being threaded onto the outer end of said screw bolt to hold the parts in connected condition. Surrounding said spacing sleeve is a spiral spring 49 having one end thereof directed upwardly and bent in contact with the ratchet lever near its lower end, as at 50, Figs. 11 and 12 and its other end directed laterally and upwardly with its extremity bent to lie in contact with the upper edge of the pawl 39, as at 51, the action of said spring being similar to that of a sear spring, although the convolutions in the spiral portion of the spring are probably more numerous than in a true sear spring, the increased number of convolutions providing the required flexibility for proper functioning of the device.

At the outer end of the pawl 39, the lower edge thereof is rounded, as at 52, and it is provided at its outer extremity with an offset-overhanging portion 53 serving as a stop against the under side of which a cushion in the form of a pad of leather 54 is secured, said pad being fastened in place by means of coated rivets, nails, or the like. The outer end of this pawl is inclined from the offset-overhanging portion 53 to the lower edge of the pawl and the pawl may therefore be described as having its outer end beveled and provided with a portion overhanging said bevel.

In the beveled end of said pawl a transverse concaved groove 55 is formed, the depth of said groove being sufficient to receive a portion of each of the ratchet pins 38 on the pitting cylinder or drum in successive order, as will appear hereinafter.

Figure 5:
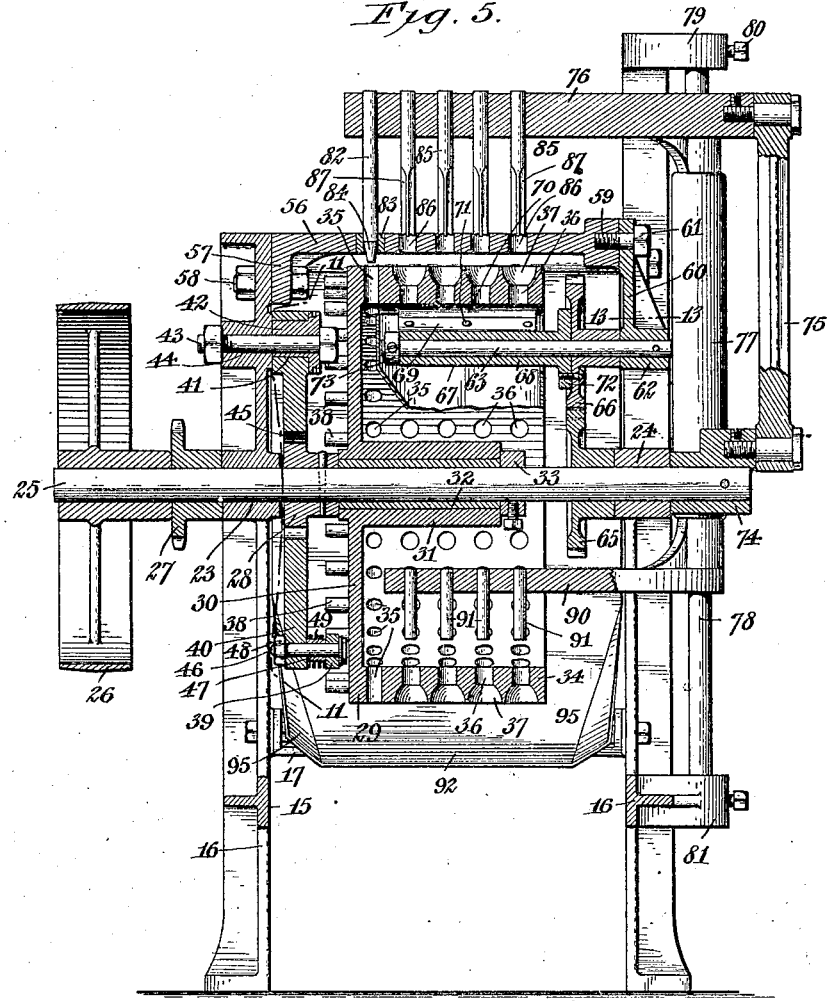
Fig. 5 is a central longitudinal section through the machine, taken on line 5—5, Fig. 1.

Positioned directly above the crest or center of the pitting cylinder or drum, is a stripper member 56, Fig. 5 which is in the form of a bar disposed lengthwise above said cylinder or drum and has fastening lugs 57 at one end through which, and one of the side members 16, securing bolts 58 are passed, said bolts fastening said bar securely in position. The opposite end of said stripper bar is enlarged to permit a bolt hole 59 to be formed lengthwise therein. Fastened to said last-mentioned end of the stripper bar is a tie bracket 60 through which a bolt 61 is passed, which is threaded into the bolt hole 59 in said stripper bar. This tie bracket extends downwardly from said stripper bar and at its lower end is provided with a boss 62 in which a spindle 63 is fastened, said spindle extending inwardly into the pitting cylinder or drum 29 in vertical alinement with the stripper member or bar 56. The tie bracket 60 is extended laterally in opposite directions, as at 64, (see Fig. 13) and opposite ends thereof are fastened to portions of the side members 16. It will be apparent therefore that one end of the stripper member 56 is fastened directly to one of the side members and the other end thereof indirectly to the other side member.

Mounted on the main or drive shaft 25 directly inside of the bearing 24 on one of the side members of the frame, is a gear wheel 65, which is in mesh with a gear wheel 66 loosely mounted on the spindle 63. The hub of said gear wheel 66 is in contact with the inner end of the boss 62 formed on the tie bracket 60. A rotatable wiper 67 is loosely mounted on the spindle 63 and comprises a sleeve-like body portion 68 having a grooved rib or extension 69 extending along a portion of its length, and in the groove of said extension a wiping strip of rubber or other suitable material 70 is fastened, rivets 71 being provided for the purpose.

The end of said sleeve-like body portion 68 is provided with an outstanding flange 72 by means of which said wiper is fastened to the gear wheel 66, screws being passed through the web of said gear wheel and threaded into said flange so that when the gear wheel 66 is rotated, the wiper will also be rotated. Lengthwise movement of the wiper along the spindle 63 in one direction, and of the gear wheel 66 to which it is secured, is prevented by the hub of said gear wheel lying in contact with the boss 62 of the tie bracket 60, while the movement of these parts in the opposite direction is prevented by a collar 73 fastened to said spindle and having the outer end of the wiper in contact therewith.

Secured to the main or drive shaft 25 outside of the bearing 24 on one of the side members, is an actuating crank 74 to which the lower end of a pitman 75 is pivotally secured, the upper end of said pitman being pivotally attached to a cross head 76 formed integral with a guide sleeve 77 arranged for vertical reciprocating movement on a guide rod 78 fastened at its upper end into an extension 79 of the frame 15 by means of a set screw 80, or otherwise, and having its lower end fastened into a lug 81 extending outwardly from said last-mentioned side member near its lower end. The cross head 76 extends inwardly from the upper end of the guide sleeve 77 directly over the stripper member 56 and is parallel therewith, and fastened into this cross head, near its outer end, is a guide or pilot pin 82 which is slidably retained in a guide bushing 83 set into the stripper member in alinement with the circular series of guide or pilot openings 35 in the pitting cylinder or drum, the lower end of said guide or pilot pin being tapered, as at 84, so that it will readily enter said guide or pilot openings successively and any slight variation in the position of the cylinder or drum will be readily corrected as the tapered lower end of said guide or pilot enters the guide or pilot opening in the cylinder or drum directly beneath said pin, the adjusted or corrected position of the cylinder or drum being effected during the time that the conical portion of said guide or pilot pin enters the guide or pilot opening in the cylinder or drum alined, or substantially alined, therewith, and the corrected position will be maintained during the time the cylindrical portion of said guide or pilot pin is entered in said guide or pilot opening.

The cross head has also a longitudinal row of depending pitting pins 85 fastened therein, which are alined with a corresponding row of openings 86 in said stripper member or bar 56 and into which the lower extremities of said pitting pins are retained when said cross head is in its elevated position. These pitting pins are longitudinally grooved, as shown at 87, and they are also grooved on their lower or cherry-engaging ends, the end grooves thereof radiating from the center outwardly and forming cutting edges for the purpose of more effectively cutting through the meat of the cherry, as is common in machines of this kind.

In the drawings I have shown four pitting pins carried by the cross head, but it is quite apparent that any number of pitting pins may be employed. The pitting cylinder or drum is also provided with four circular series of pitting openings, and consequently the number of pitting openings in each longitudinal row in the cylinder or drum corresponds to the number of pitting pins depending from the cross head.

It will be apparent from the foregoing, that the rotation of the main or drive shaft 25 will cause the cam 28 to actuate the ratchet lever 40, which is caused thereby to oscillate on the eccentric bushing 42, and that movement of said lever in the direction of the arrow 88 shown in Fig. 11, will move the outer end of the pawl 39 away from the ratchet pin 38 with which it is shown engaged. During such movement the lower edge of the pawl travels in contact with the following ratchet pin, until the beveled edge of said pawl passes over said last-mentioned pin, whereupon the pawl will be depressed by the spiral or sear spring 49, bringing said last-mentioned ratchet pin in contact with the leather pad 54 of said pawl and into the transverse concaved groove 55. With the pin so positioned, the cam 28 will have moved the ratchet lever 40 to the extreme left in Fig. 11, and said cam will next move said lever to the right or in the direction of the arrow 89 shown in said figure, whereupon the pawl will cause the pitting cylinder or drum to rotate the distance of one pin, and as these pins are spaced to correspond to the longitudinal rows of pitting openings in the pitting cylinder or drum, the next longitudinal row of pitting openings, and the guide or pilot opening alined therewith, will be moved directly underneath the stripping member 56.

Including the main or driving shaft 25, the cam 28, ratchet lever 40, pawl 39 and the ratchet pins 38 constitute the cylinder or drum operating mechanism.

By reason of the gear wheel 65 being fastened to the main or drive shaft 25, said gear wheel will be rotated by said shaft and will in turn cause the gear wheel 66 and the wiper 67 attached thereto, to rotate. Therefore, including the main or drive shaft, said gear wheels 65 and 66 constitute the wiper operating mechanism.

By reason of the actuating crank 74 being fastened to the main or drive shaft 25, the pitman 75 will be caused to be operated, which in turn will move the cross head 76 upwardly and downwardly and cause reciprocation of the guide or pilot pin 82 and the pitting pins 85, respectively, into and through the guide or pilot opening 35 and the pitting openings 36 directly beneath the stripper member 56. Therefore, in conjunction with the main or drive shaft 25, the actuating crank 74 and pitman 75 constitute the operating mechanism for the pitting mechanism.

Extending inwardly from the lower end of the guide sleeve 77 is an ejector arm or cross head 90 in which is fastened a series of ejector pins 91 corresponding in number to the number of pitting openings in each longitudinal row of pitting openings in the cylinder or drum, the centers of said pins corresponding to the spaces between the centers of said openings. These ejector pins are adapted to be raised and lowered, and when lowered they pass through the pitting openings of the longitudinal row in the cylinder or drum directly beneath the same and serve to eject any pitted cherries that may lodge in the cavities of said openings when reaching this point. It is, however, to be understood that the pitted cherries remaining in the cavities or pockets 37 of the cylinder or drum invariably free themselves when the drum rotates, and are delivered into a chute 92 arranged at one side of said cylinder or drum, the upper end of said chute being fastened to the connector tie bolt 19, or more particularly, to the spacing sleeve 20 surrounding said tie bolt, as at 93, while the lower end rests against the channeled connector member 17, as at 94. When the cavities 37 of the cylinder or drum reach positions below the horizontal center of the latter, the pitted cherries will release themselves from the cavities and drop into the chute 92 and from the latter may be directed into a suitable dish or receptacle positioned underneath the lower end of said chute.

In order to prevent the cherries rolling off the sides of the chute, said chute is provided along its lower portions with side walls 95.

The cherries are adapted to be fed to the longitudinal rows of cavities or pockets 37 formed in the pitting cylinder or drum 29, and for this purpose a feed hopper 96 is provided which has opposite side walls 97, an outer end wall 98, and an inclined bottom 99. The hopper is narrowed along its inner region and for this purpose the side walls 97 are provided with oblique portions 100 between their ends. Said hopper is pivotally supported near its outer end by the tie rod 21.

Figure 6:
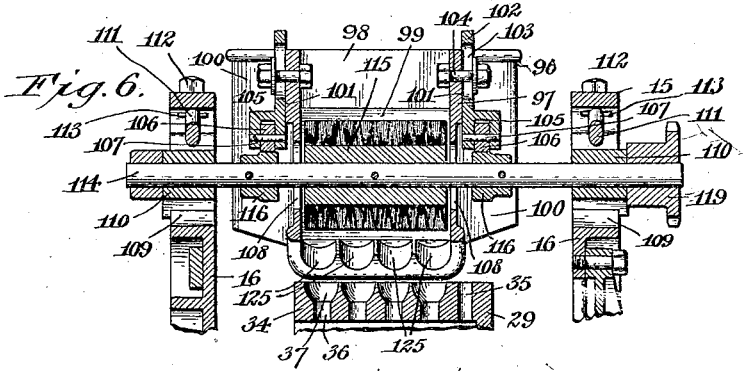
Fig. 6 is a vertical section taken on line 6—6, Fig. 1, looking in the direction of the arrow crossing said line.

At the inner end of each of the side walls 97 a vertically-disposed guideway 101 is provided, Figs. 6 and 7, each of said guideways comprising spaced external ribs between which a roller support 102 is adjustably arranged. Each of said roller supports comprises a flat or bar-like member provided with a longitudinal slot 103 through which, and an opening in the side walls carrying said roller support, a securing bolt 104 is passed. The lower end of each roller support is outwardly offset and forked, as at 105, and in the forked portion thereof a roller 106 is rotatably arranged, said roller being rotatable on a pin 107 fastened in the spaced arms of said forked portion, as best shown in Fig. 6.

Each of the side walls 97 of the feed hopper is also provided with a substantially T-shaped opening 108, the stem of which opens through the inner edge of said wall. These openings are transversely alined and arranged beneath the roller supports 102. Each of these openings extends inwardly from the inner edge of one of the side walls and is arcuate, with the center thereof co-axial with the center of the main or drive shaft 25, and at the inner end of each of these arcuate openings, lateral enlargements are formed so that the substantially T-shaped opening thus provided has its stem at a slight angle to the horizontal and its head portion at a slight angle to the vertical.

In the side members 16 of the frame, rectangular bearing-box openings 109 are formed which are also disposed at a slight angle to the vertical and are alined with the head portions of said T-shaped openings in the side walls of the hopper. In each of these bearing-box openings, bearing boxes or blocks 110 are adjustably arranged, and for the purpose of adjustment, each has an adjusting screw 111 threaded therethrough, said screws being rotatable in the upper walls of the bearing-box openings 109 and having heads 112 for conveniently rotating said screws, said heads preventing lengthwise movement of said screws in one direction while retainer pins 113 are passed through said screws and bear against the inner sides of the top walls of said bearing-box openings to prevent movement of said adjusting screws lengthwise in the opposite direction. Therefore, upon rotating said adjusting screws in one direction, the bearing boxes or blocks are elevated within the bearing-box openings, while upon rotating said adjusting screws in the opposite direction, said bearing-boxes or blocks are lowered in said openings.

Rotatably mounted in said bearing-boxes or blocks is a transverse shaft 114 which also extends through the head portions of the T-shaped openings 108 in the side walls of the feed hopper, and mounted on said shaft within the narrowed inner portion of said feed hopper is a cylindrical brush 115 (Fig. 6) which is pinned or otherwise fastened to said shaft. It is to be noted that the side walls 97 of the feed hopper extend inwardly a greater distance than the inclined bottom of said hopper and the lower edge of the inwardly-extending portions of said side walls are curved to conform to the curvature of the cylinder or drum 29, although slightly spaced therefrom, as clearly shown in Fig. 7.

Mounted on the shaft 114 directly beneath the rollers 106 on the roller supports are hopper-actuating cams 116, these cams being secured to said shaft by means of pins, or otherwise. The rollers 106 are held in contact with said cams by a retractile spring 117, one end of which is secured to a lug 118 depending from the inclined bottom of the feed hopper and the other end to the tie rod 22.

When the shaft 114 is rotated, the hopper actuated cams 116 cause slight oscillating movement of the hopper, and the spring 117 serves to keep the rollers 106 in contact at all times with the said cams 116. Said cams also act as stops to limit the downward movement of the hopper, thereby serving to keep the inner end of the hopper in close proximity to the cylinder or drum 29, said hopper oscillating on the tie rod 21, which serves as its center.

Fastened to the shaft 114 at one side of the machine, is a sprocket wheel 119 around which, and the sprocket wheel 27 fastened to the main or drive shaft 25, a sprocket chain 120 passes, said chain having one of its side stretches traveling in meshing contact with an idler sprocket 121 rotatably mounted on a stud 122 secured into the outer end of a bracket 123 fastened by a bolt 124 to one of the side members of the frame, said bolt permitting swinging adjustment of said bracket for the purpose of tightening or loosening said sprocket chain.

That portion of the inclined bottom extending along the narrow region thereof is fluted or grooved longitudinally, as at 125, each groove being alined with one of the circumferential series of pitting openings 36 in the cylinder or drum, the purpose of such grooves being to assure cherries to be delivered into each pitting opening in the longitudinal row of openings positioned at the crest or highest point of the cylinder or drum and with a view of aiding the grooves in this, the cylindrical brush 115, and parts to be presently described, also arranged in the feed hopper coact with said grooves.

One of the connector members 17 is provided with a pair of spaced lugs 126 to which one end of an angular brake lever 127 is secured, the other end of said brake lever having one end of a retractile spring 128 secured thereto, the other end of said spring being fastened to an S-shaped connector 129 hooked onto the tie rod 22. To the angle of said brake lever a brake shoe 130 is pivotally connected, which is adapted to bear with the required pressure against the cylinder or drum 29 at one end thereof, it being the purpose of this brake shoe to offer the necessary resistance to the rotary movement of the cylinder or drum so that when the latter is actuated by the pawl 39, the movement of said cylinder or drum will be as near as possible such as to correspond to the movement of said pawl and there will be no opportunity for the cylinder or drum to over-extend its movement, which it will be clear from the foregoing, shall only be sufficient to move the cylinder or drum a distance sufficient to bring one longitudinal row of cherry receiving cavities after the other in line with the pitting pins. The brake also serves to hold the cylinder or drum against rotation between movements thereof.

In order to regulate the feeding of the cherries from the hopper into the cavities of the cylinder or drum, said hopper is provided with a control plate 131 (Fig. 7) which has its lower edge spaced from the inclined bottom of the hopper a distance to allow one row or layer of cherries to pass underneath the same at a time, and between said control plate and the hopper brush 115 is a stop plate 132 having its lower edge at a higher elevation than the lower edge of said control plate, for a purpose to appear hereinafter.

Upon rotation of the main or drive shaft 25, the pitting cylinder or drum 29 is given intermittent rotary movement in the direction of the arrow 133 shown in Fig. 7, while the longitudinal rows of pitting openings in said cylinder or drum are successively brought into alinement with the pitting pins 87, these pins being reciprocated so as to pass through the pitting openings under the movement of the cross head 76 to which said pins are secured, said cross head being operated by the pitman 75 which is connected to the actuating crank 74 fastened to said main or drive shaft. Simultaneously with the movement of the pitting pins, operation of the ejector pins 91 takes place, for the purpose of ejecting from the cavities any pitted cherries remaining when the cavities reach the lowermost point in their circular path or travel.

When the pitting pins 85 are passed downwardly through the cherries contained in the cavities of the pitting openings formed in the cylinder or drum and arranged in alinement with said pitting pins, the pits of the cherries are forced inwardly into the interior of the cylinder or drum by the pitting pins and are delivered into a chute 134 from which they are directed outwardly to the side of the machine, said chute having a hopper-like upper end 135 arranged with said cylinder or drum and a leg 136 directed downwardly and laterally and terminating outside of the frame for conveniently discharging the pits into a receptacle placed upon the floor or other foundation from which the machine receives support.

The rotatable wiper is driven so that it will rotate in contact with the interior of the drum each time a longitudinal series of pitting openings is brought in alinement with the pitting pins, and any pits, pulp or other matter adhering to the interior of the drum, will be removed therefrom and directed into the chute 134 to be delivered to the side of the machine, said rotatable wiper being actuated by the gears 65, 66, the gear 65 being fastened to the main or drive shaft.

It is to be noted that the hopper brush is rotated in the direction of the arrow 137 shown in Fig. 7 of the drawings, and that therefore the cherries rolling down the inclined bottom wall are retarded in their discharge from the feed hopper, the brush acting against the cherries and causing them to be fed one at a time from the grooves 125 formed in the bottom of the hopper at the feeding end thereof. The stop plate 132 prevents any of the cherries being carried upwardly by the brush so as to be delivered over the top of the brush, while the control plate 131 has its lower edge spaced a distance from the inclined bottom of the hopper so that two layers of cherries cannot pass underneath the same at one time. Due to the fact that the cams 116 on the hopper shaft 114 agitate the hopper and cause it to oscillate on the tie rod 21 as its center, there will be a single cherry arranged in each groove 125 ready to be delivered into the next longitudinal row of cavities brought in registration with said grooves, and after the third step by step movement of the cylinder or drum in the direction of the arrow 133, Fig. 7, the cherries will be brought directly beneath the pitting pins 85 so that the pits may be removed therefrom while the pitted cherries will be retained in the cavities and carried along to be delivered into the chute 92 and be discharged therefrom.

In the modification shown in Fig. 14, the main or drive shaft 25 is driven by means of an electric motor, designated by the numeral 138 and supported by a bracket 139 fastened to the frame of the machine at one side thereof. The shaft of the motor is provided with a worm 140, which is in mesh with a worm wheel 141 fastened to the main or drive shaft. The worm and worm wheel are encased within a housing 142 suitably fastened to the frame and having bearings in which the motor shaft is rotatably mounted.

Having thus described my invention what I claim is:—

1. In a pitting machine the combination with a frame, a shaft rotatable in said frame and a pitting cylinder loosely mounted on said shaft, of wiping mechanism within said cylinder actuated from said shaft, means operated from said shaft for imparting intermittent rotary movement to said cylinder, reciprocable pitting pins co-acting with said pitting cylinder, and means actuated by said shaft for reciprocating said pitting pins.

2. A pitting machine comprising a frame, a shaft rotatably mounted within said frame, a pitting cylinder loosely mounted on said shaft and held against lengthwise movement thereon, said pitting cylinder having pitting openings therein, reciprocable pitting pins adapted to enter said pitting openings, means operated by said shaft for reciprocating said pitting pins, co-operating ratchet mechanism on said frame and cylinder, and means on said shaft for actuating said ratchet mechanism.

3. A pitting machine, comprising a frame having connected side members, a shaft rotatable in said side members, a pitting cylinder rotatable on said shaft and held against lengthwise movement thereon, a rotatable wiper within said pitting cylinder acting against the inner surface of the latter, and means interposed between said wiper and said shaft for causing rotation of said wiper.

4. In a pitting machine, a pitting cylinder having pitting openings therein, a circular series of pins extending from one end of said cylinder, mechanism for successively engaging said pins and causing intermittent rotary movement of said pitting cylinder, and means operating independently of said pins to hold said cylinder against rotatable movement after each intermittent rotary movement of said cylinder.

5. In a pitting machine, a pitting cylinder having pitting openings therein, a circular series of pins extending from one end of said cylinder, mechanism for successively engaging said pins and causing intermittent rotary movement of said pitting cylinder, and means operating independently of said pins to limit the extent of such intermittent rotary movement and prevent rotary movement of said cylinder between the intermittent rotary movement.

6. In a pitting machine, a pitting cylinder having pitting openings therein, a circular series of pins extending from one end of said cylinder, mechanism for successively engaging said pins and causing intermittent rotary movement of said pitting cylinder, and a brake device operating independently of said pins in contact with said cylinder.

7. In a pitting machine, a pitting cylinder having pitting openings therein, a circular series of pins extending from one end of said cylinder, mechanism for successively engaging said pins and causing intermittent rotary movement of said pitting cylinder, and a brake device operating independently of said pins and in contact with the exterior peripheral surface of said cylinder.

8. In a pitting machine, a pitting cylinder having pitting openings therein, a circular series of pins extending from one end of said cylinder, mechanism for successively engaging said pins and causing intermittent rotary movement of said pitting cylinder, and a spring-pressed brake device operating independently of said pins in contact with the exterior peripheral surface of said cylinder.

9. In a pitting machine, a pitting cylinder having pitting openings therein, a circular series of pins extending from one end of said pitting cylinder, mechanism for successively engaging said pins and causing intermittent rotary movement of said pitting cylinder, a brake device bearing against said cylinder and comprising a brake shoe, a lever to which said brake shoe is pivotally connected, and a retractile spring connected to said lever to hold said shoe against said cylinder.

10. A pitting machine, comprising a frame having two spaced side members, a tie rod and connector member connecting said side members together, a pitting cylinder mounted between said side members, means for imparting intermittent rotary movement to said cylinder, an angular lever pivoted at one end to one of said connector members, a brake shoe pivotally connected to said angular lever at the angle thereof, and a retractile spring having one end connected to the other end of said lever and its other end connected to said tie rod.

11. A pitting machine, comprising a frame, a shaft rotatable in said frame, a cylinder loosely mounted on said shaft and held against lengthwise movement thereon, said cylinder having pitting openings therein, pitting pins co-operating with said pitting openings, a spindle fastened in said frame and extending into said cylinder, a gear wheel on said shaft, a gear wheel loosely mounted on said spindle, and a wiper within said cylinder having a portion thereof extending from one end thereof and being fastened to said last-mentioned gear wheel.

12. A pitting machine, comprising a frame, a shaft rotatable within said frame, a pitting cylinder loosely mounted on said shaft and held against movement lengthwise thereon, means for imparting intermittent rotary movement to said cylinder, a spindle secured to said frame and extending into said cylinder, a gear wheel fastened to said shaft, a gear wheel loosely mounted on said spindle, and a rotatable wiper within said cylinder and comprising a sleeve-like body portion having a grooved rib extending along a portion of its length, and a wiping strip fastened in said grooved rib, said sleeve-like portion having an outstanding flange at its outer end fastened to said last-mentioned gear wheel, said wiping strip being adapted for wiping contact with the internal surface of said cylinder.

13. A pitting machine, comprising a frame, a shaft continuously rotatable in said frame, a pitting cylinder loosely mounted on said shaft and held against lengthwise movement thereon, said pitting cylinder having a circular series of longitudinal sets of pitting openings therein, means interposed between said shaft and said pitting cylinder for intermittently rotating said pitting cylinder and converting the continuous rotary movement of said shaft to intermittent rotary movement for said rotary cylinder, connected pitting pins and ejector pins arranged for movement into and out of said pitting openings from the exterior and from the interior of said frame, respectively, and means for simultaneously reciprocating said pitting pins and ejector pins.

14. A pitting machine, comprising a frame, a shaft rotatable in said frame, a pitting cylinder on said shaft arranged for intermittent rotary movement and having a circular series of longitudinal sets of pitting openings therein, a vertically reciprocating element including cross heads extending, respectively, above said pitting cylinder and into said pitting cylinder, pitting pins on one of said cross heads, ejector pins on the other cross head, means for operating said reciprocating element from said shaft to cause said pitting pins to enter said pitting openings from the exterior of said cylinder and said ejector pins to enter said pitting opening from the interior of said cylinder.

15. A pitting machine, comprising a frame, a shaft rotatable on said frame, a pitting cylinder mounted on said shaft for intermittent rotary movement, a vertically-disposed guide rod on said frame, a guide sleeve surrounding said guide rod and having a cross head at its upper end extending lengthwise over the top of said cylinder and a cross head at its lower end extending lengthwise into said cylinder, a crank on said shaft, a pitman connecting said crank with the outer end of said first-mentioned cross head, pitting pins extending downwardly from one of said cross heads and adapted to enter said pitting openings from the exterior of said cylinder, and ejector pins on the other of said cross heads adapted to enter said pitting openings from the interior of said cylinder.

16. A pitting machine, comprising a frame having two spaced side members, a shaft rotatably mounted in said frame, a pitting cylinder on said shaft arranged for intermittent rotary movement and having a circular series of longitudinal sets of pitting openings therein, a cross head disposed lengthwise above said pitting cylinder, a second cross head disposed lengthwise in said cylinder, means for operating said cross heads in unison from said shaft, pitting pins on said first-mentioned cross head adapted to enter the longitudinal rows of stripper openings in said cylinder successively from the exterior, and ejector members on said second cross head adapted to enter the longitudinal sets of stripper openings successively from the interior of said cylinder.

17. A pitting machine, comprising a frame having two spaced side members, a shaft rotatably mounted in said side members, a pitting cylinder on said shaft provided with spaced sets of pitting openings and a series of pilot openings, a reciprocating element movable toward and from said pitting cylinder, a pilot pin carried by said reciprocating element and adapted to successively enter said pilot openings, pitting pins carried by said reciprocating element and adapted to successively enter said sets of pitting openings, said pilot pin entering a pilot opening before said pitting pins enter a set of pitting openings, and means for actuating said reciprocating element from said shaft.

18. A pitting machine comprising a frame having two spaced side members, a shaft rotatably mounted in said side members, a pitting cylinder on said shaft arranged for intermittent rotary movement and having a circular series of longitudinal sets of pitting openings therein, a vertically-disposed guide rod on one of said side members, a guide sleeve mounted for reciprocating movement on said guide rod and having a cross head extending inwardly therefrom at its upper end and a cross head extending inwardly therefrom at its lower end, means for reciprocating said guide sleeve from said shaft, pitting pins on the upper cross head, and ejector pins on the lower cross head.

19. In a pitting machine, a frame having two side members, connector members connecting said side members and a tie bolt connecting said side members in a plane above said connector members, a pitting cylinder mounted for intermittent rotary movement between said side members and having pitting openings therein, and a chute arranged at one side of said cylinder and having its upper end fastened to said tie bolt and being thence directed downwardly and inwardly to receive support from one of said connector members, the lower end of said chute terminating underneath said pitting cylinder between said side members.

20. A pitting machine, comprising a frame, a shaft rotatable on said frame, means for rotating said shaft, a pitting cylinder loosely mounted on said shaft and having ratchet elements extending from one end thereof, a ratchet lever pivotally mounted on said frame and having an elongated opening therein, an eccentric on said shaft within said elongated opening adapted to actuate said lever, and means carried by said lever for engagement with said ratchet elements to cause intermittent rotary movement of said pitting cylinder.

21. A pitting machine, comprising a frame, a shaft rotatable in said frame, a pitting cylinder loosely mounted on said shaft and provided with ratchet elements, a bolt extending from said frame, an adjustable eccentric bushing on said bolt, a ratchet lever hung on said eccentric bushing, means for oscillating said ratchet lever from said shaft, and means on said ratchet lever co-acting with the ratchet elements of said pitting cylinder to intermittently rotate said cylinder.

22. In a pitting machine, the combination with a frame, of a shaft rotatable in said frame, a pitting cylinder loosely mounted on said shaft and having a circular series of pins extending from one end thereof, a ratchet lever pivotally mounted at one end, a pawl pivotally secured to said ratchet lever and adapted for successive engagement with said pins, and means for oscillating said ratchet lever from said shaft.

23. In a pitting machine, the combination of a rotatable shaft, a pitting cylinder loosely mounted on said shaft and having a circular series of ratchet pins extending from one end thereof, a ratchet lever pivotally secured at one end and having an opening between its ends, an eccentric on said shaft in contact with opposite walls of said opening for oscillating said ratchet lever, and a spring-retained pawl pivotally secured to the other end of said lever and adapted to successively engage said ratchet pins to intermittently rotate said pitting cylinder.

24. A pitting machine comprising a shaft, a pitting cylinder provided with a circular series of ratchet pins, a ratchet lever pivotally supported, means for oscillating said ratchet lever from said shaft, a pawl pivotally secured to one end of said ratchet lever and provided with an offset overhanging portion at its outer end, said pawl being adapted for successive engagement at its outer end with said ratchet pins, and a spring to keep said pawl in engagement with one of said ratchet pins and to cause said pawl to move in contact with a succeeding ratchet pin of said circular series during the movement of said ratchet lever in one direction, said pawl causing said pitting cylinder to rotate a predetermined distance during the movement of said ratchet lever in its opposite direction.

25. A pitting machine comprising a shaft, a pitting cylinder provided with a circular series of ratchet pins, a ratchet lever arranged for oscillating movement and operated by said shaft, a pawl pivotally connected to said ratchet lever and having an overhanging portion at its outer end serving as a stop, the under side of said overhanging portion being provided with a pad, the outer end of said pawl being inclined from said overhanging portion to the lower edge thereof and being provided with a concaved groove in its inclined portion and with a rounded portion at its lower edge adjacent its inclined end, and a spring to hold said pawl in contact successively with said ratchet pins.

26. A pitting machine comprising a shaft, a pitting cylinder provided with a circular series of ratchet pins, a ratchet lever pivotally mounted for oscillation and operated by said shaft, a screw bolt passed through the outer end of said ratchet lever and having a spacing sleeve thereon, a pawl mounted on said screw bolt, and a spring surrounding said spacing sleeve and having terminals, respectively, engaging said ratchet lever and said pawl to cause said pawl to successively engage said ratchet pins and to intermittently rotate said cylinder.

27. A pitting machine comprising a frame, a shaft rotatable in said frame, a pitting cylinder loosely mounted on said shaft and held against lengthwise movement thereon, said pitting cylinder having a circular series of ratchet pins extending from one end thereof, a bolt secured to said frame, an eccentric bushing rotatably adjustable on said bolt, a ratchet lever hung on said eccentric bushing and provided with an elongated opening between its ends, an eccentric on said shaft in contact with opposite walls of said opening for oscillating said lever, a pawl pivotally secured to the free end of said ratchet lever, and a spring to cause said pawl to be maintained against the successive ratchet pins so as to cause intermittent rotary movement of said cylinder upon oscillation of said ratchet lever.

28. A pitting machine, comprising a frame having opposite side members, a main shaft journaled in said side members, a pitting cylinder rotatable on said main shaft, means interposed between said cylinder and said main shaft for intermittently rotating said cylinder from said shaft, a feed hopper supported by said side members, a second shaft journaled in said side members and extending through said hopper, a brush secured to said shaft, and means for rotating said second shaft from said main shaft.

29. A pitting machine, comprising a frame having opposite side members, a shaft journaled in said side members, a pitting cylinder rotatable on said shaft, a feed hopper adjacent said pitting cylinder and pivotally connected to said frame, opposite side walls of said feed hopper having openings therein, a second shaft journaled in said side members and extending through the openings in the side walls of said hopper, a brush secured to said shaft within said hopper, and means for rotating said second shaft from said main shaft.

30. A pitting machine, comprising a frame having two spaced side members, a shaft rotatably mounted in said side members, a pitting cylinder loosely mounted on said shaft for rotary movement independent of said shaft, a feed hopper pivotally mounted on said frame and having T-shaped openings in its side walls at its feeding end, the stems of said T-shaped openings extending to the inner edges of said side walls, a shaft journaled in said side members and extending through said T-shaped openings, a brush within said hopper secured to said shaft, means for causing vibratory movement of said hopper, and means for rotating said brush from said main shaft.

31. A pitting machine, comprising a frame having two spaced side members, a shaft rotatably mounted in said side members, a pitting cylinder loosely mounted on said shaft for intermittent rotary movement independent of said shaft, a feed hopper pivotally mounted between said side members and having an inclined bottom and side walls provided with alined T-shaped openings, the stems of said T-shaped openings extending to the inner edges of said side walls, a brush within said hopper, a shaft extending through said T-shaped openings and having said brush secured thereto, and means for rotating said last-mentioned shaft from said first-mentioned shaft.

In testimony whereof I affix my signature.

CHARLES T. HOWSON.